(12) United States Patent
Bolenbaugh et al.

(10) Patent No.: US 8,771,137 B2
(45) Date of Patent: Jul. 8, 2014

(54) METHOD FOR USE OF HYDRAULICALLY OR ELECTRICALLY CONTROLLED SOLENOIDS UNDER FAILED ON CONDITIONS

(75) Inventors: Jonathan M. Bolenbaugh, Ann Arbor, MI (US); Syed Naqi, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/534,345

(22) Filed: Jun. 27, 2012

(65) Prior Publication Data

US 2014/0004995 A1      Jan. 2, 2014

(51) Int. Cl.
*B60W 10/02*          (2006.01)

(52) U.S. Cl.
USPC ............................................... 477/5

(58) Field of Classification Search
USPC ............. 477/5, 130, 906, 131, 161, 143, 155, 477/79, 123, 156, 115, 3; 475/127, 128, 5; 180/65.275, 65.21; 903/902
See application file for complete search history.

(56) References Cited

U.S. PATENT DOCUMENTS

| | | | |
|---|---|---|---|
| 7,869,924 B2 * | 1/2011 | Wu et al. | 701/51 |
| 2009/0082150 A1 * | 3/2009 | Wu et al. | 475/5 |
| 2009/0111643 A1 | 4/2009 | Sah et al. | |
| 2011/0070991 A1 * | 3/2011 | Wu et al. | 475/5 |
| 2011/0144872 A1 * | 6/2011 | Long et al. | 701/58 |

* cited by examiner

*Primary Examiner* — David D Le
*Assistant Examiner* — David J Hlavka (57) ABSTRACT

A method to operate a clutch device in an electro-mechanical transmission mechanically-operatively coupled to an internal combustion engine and at least one electric machine includes, in response to a failure condition detected within a flow control device configured to facilitate flow of hydraulic fluid for operating the clutch device, selectively preventing the flow of hydraulic fluid from entering the flow control device and feeding the clutch device. Synchronization of the clutch device is initiated when the clutch device is intended for activation, and only if the clutch device is synchronized, the flow of hydraulic fluid is selectively permitted to enter the flow control device to activate the clutch device.

19 Claims, 5 Drawing Sheets

METHOD FOR USE OF HYDRAULICALLY OR ELECTRICALLY CONTROLLED SOLENOIDS UNDER FAILED ON CONDITIONS

GOVERNMENT CONTRACT RIGHTS

This invention was made with U.S. Government support under Agreement No. DE-FC26-08NT04386 awarded by the U.S. Department of Energy. The U.S. Government may have certain rights in this invention.

TECHNICAL FIELD

This disclosure is related to control systems for electro-mechanical transmissions, and more specifically to control of a hydraulic circuit.

BACKGROUND

The statements in this section merely provide background information related to the present disclosure. Accordingly, such statements are not intended to constitute an admission of prior art.

Hybrid powertrain architectures include torque-generative devices, including internal combustion engines and electric machines, which transmit torque through a transmission device to a vehicle driveline. Exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch activation and deactivation is typically effected through a hydraulic circuit, including electrically-actuated hydraulic flow management valves, pressure control solenoids, and pressure monitoring devices controlled by a control module.

It is known for example, to inhibit the utilization of a clutch in order to prevent hydraulic flow from feeding the clutch during conditions in which an associated pressure control solenoid is stuck. Inhibiting the utilization of a clutch results in limited operation of the hybrid powertrain.

SUMMARY

A method to operate a clutch device in an electro-mechanical transmission mechanically-operatively coupled to an internal combustion engine and at least one electric machine includes, in response to a failure condition detected within a flow control device configured to facilitate flow of hydraulic fluid for operating the clutch device, selectively preventing the flow of hydraulic fluid from entering the flow control device and feeding the clutch device. Synchronization of the clutch device is initiated when the clutch device is intended for activation, and only if the clutch device is synchronized, the flow of hydraulic fluid is selectively permitted to enter the flow control device to activate the clutch device.

BRIEF DESCRIPTION OF THE DRAWINGS

One or more embodiments will now be described, by way of example, with reference to the accompanying drawings, in which.

DETAILED DESCRIPTION

Figure 1:
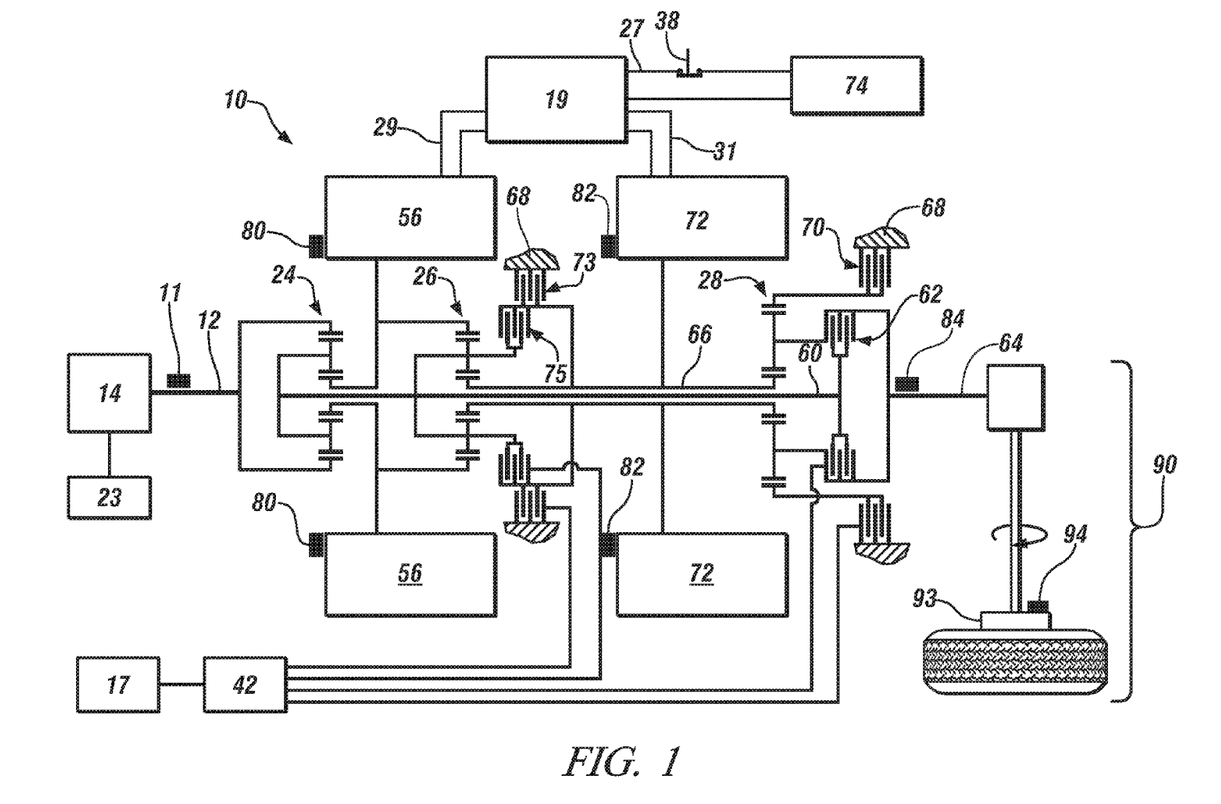
FIG. 1 illustrates an exemplary powertrain, in accordance with the present disclosure.
Figure 2:
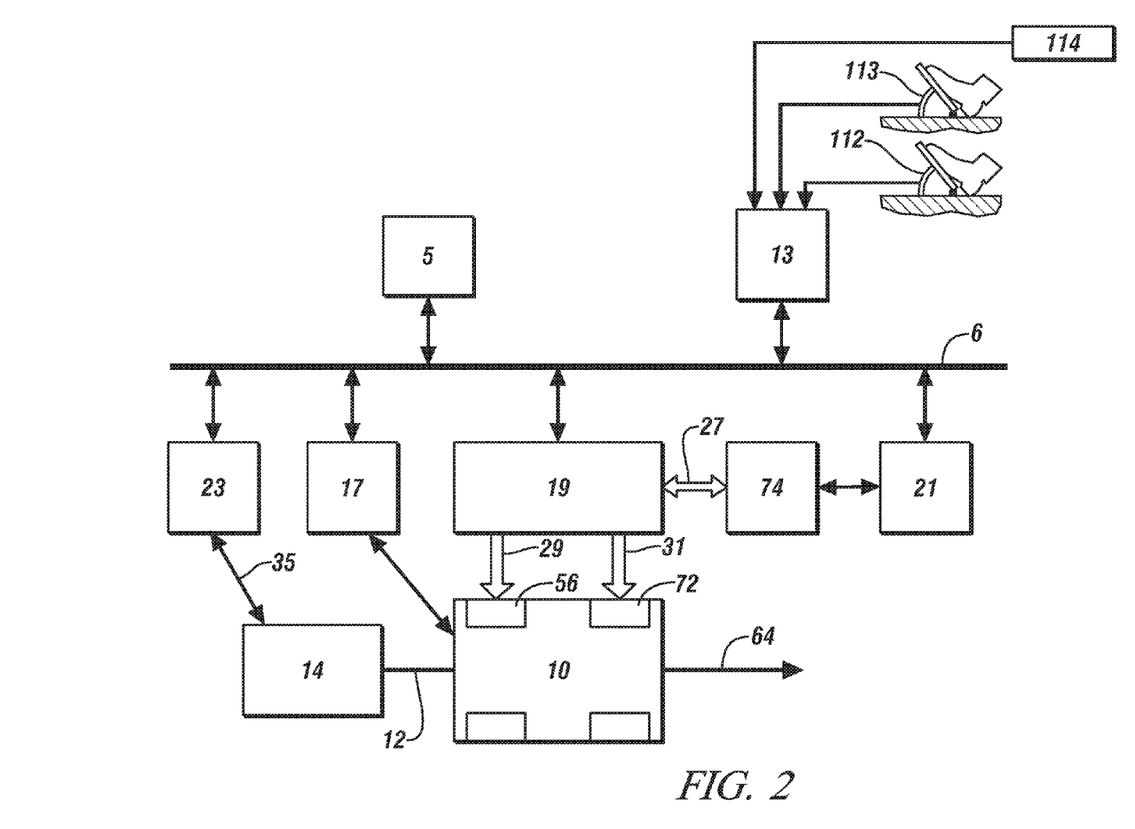
FIG. 2 illustrates an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, including a two-mode, compound-split, electro-mechanical hybrid transmission 10 operatively connected to an engine 14 and first and second electric machines (MG-A) 56 and (MG-B) 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 includes a multi-cylinder internal combustion engine selectively operative in several states to transmit torque to the transmission 10 via an input shaft 12, and can be either a spark-ignition or a compression-ignition engine. The engine 14 includes a crankshaft operatively coupled to the input shaft 12 of the transmission 10. A rotational speed sensor 11 monitors rotational speed of the input shaft 12. Power output from the engine 14, including rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump and/or a torque management device.

The exemplary transmission 10 includes three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably comprise three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle, to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters and respective motor control modules configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors for converting DC power from the ESD 74 to AC power for powering respective ones of the first and second electric machines 56 and 72, by switching at high frequencies. The insulated gate bipolar transistors form a switch mode power supply configured to receive control commands. Each phase of each of the three-phase electric machines includes one pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes routines to control various actuators to achieve control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of devices through which a vehicle operator controls or directs operation of the electromechanical hybrid powertrain. The devices include an accelerator pedal 113 (AP) from which an operator torque request is determined, an operator brake pedal 112 (BP), a transmission gear selector 114 (PRNDL), and a vehicle speed cruise control. The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus.

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ($T_{O\_REQ}$), a commanded output torque ($T_{CMD}$) to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices and generating and communicating control signals to various solenoids thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic control circuit 42 to selectively actuate the various clutches C1 70, C2 62, C3 73, and C4 75 to achieve various transmission operating range states, as described hereinbelow.

The BPCM 21 is signally connected to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The exemplary powertrain selectively operates in one of several operating range states that can be described in terms of an engine state including one of an engine on state (ON) and an engine off state (OFF), and a transmission state including a plurality of fixed gears and continuously variable operating modes, described with reference to Table 1, below.

TABLE 1

| Description | Engine State | Transmission Operating Range State | Applied Clutches |
|---|---|---|---|
| MI_Eng_Off | OFF | EVT Mode I | C1 70 |
| MI_Eng_On | ON | EVT Mode I | C1 70 |
| FG1 | ON | Fixed Gear Ratio 1 | C1 70 C4 75 |
| FG2 | ON | Fixed Gear Ratio 2 | C1 70 C2 62 |
| MII_Eng_Off | OFF | EVT Mode II | C2 62 |
| MII_Eng_On | ON | EVT Mode II | C2 62 |
| FG3 | ON | Fixed Gear Ratio 3 | C2 62 C4 75 |
| FG4 | ON | Fixed Gear Ratio 4 | C2 62 C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON (MI_Eng_On) or OFF (MI_Eng_Off). A second continuously variable mode, i.e., EVT Mode II, or MII, is selected by applying clutch C2 62 only to connect the shaft 60 to the carrier of the third planetary gear set 28. The engine state can be one of ON (MII_Eng_On) or OFF (MII_Eng_Off). For purposes of this description, when the engine state is OFF, the engine input speed is equal to zero revolutions per minute (RPM), i.e., the engine crankshaft is not rotating. A fixed gear operation provides a fixed ratio operation of input-to-output speed of the transmission 10, i.e., $N_I/N_O$, is achieved. A first fixed gear operation (FG1) is selected by applying clutches C1 70 and C4 75. A second fixed gear operation (FG2) is selected by applying clutches C1 70 and C2 62. A third fixed gear operation (FG3) is selected by applying clutches C2 62 and C4 75. A fourth fixed gear operation (FG4) is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
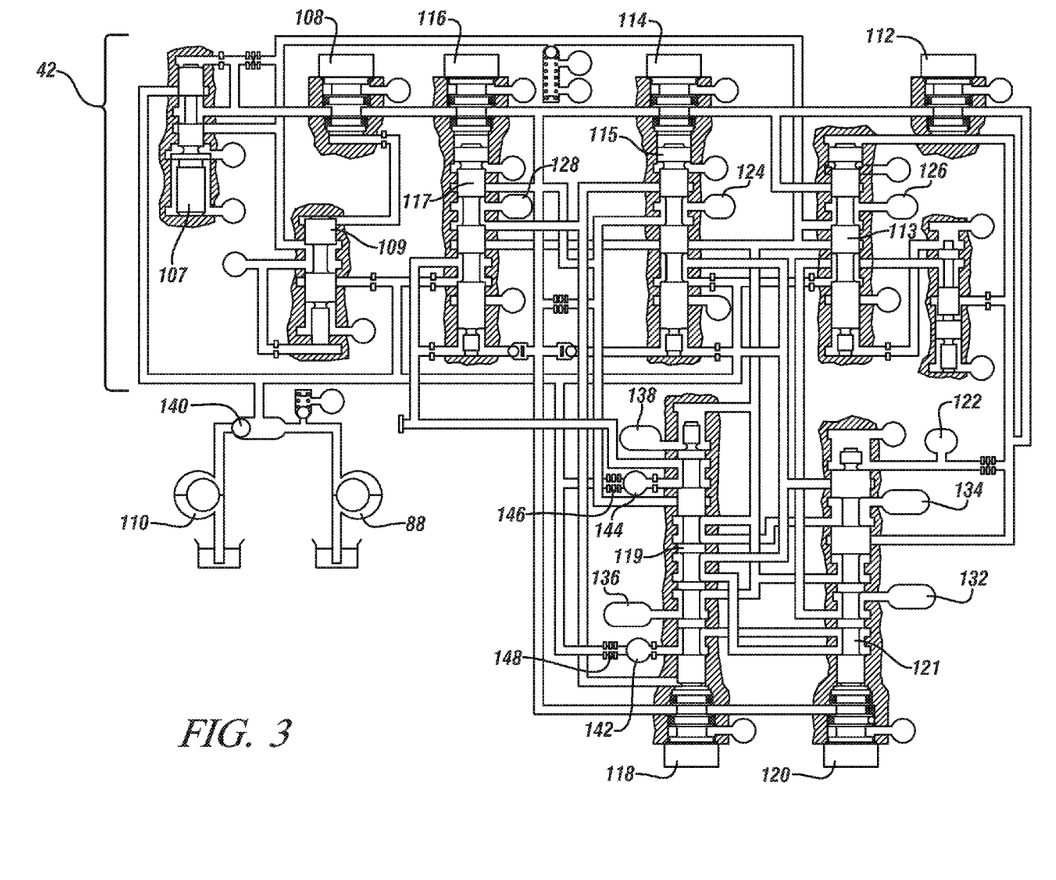
FIG. 3 illustrates an hydraulic circuit, in accordance with the present disclosure.

FIG. 3 depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably includes an electrically-powered pump of an appropriate size and capacity to provide sufficient flow of pressurized hydraulic oil into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72, and a base cooling circuit for cooling and lubricating the transmission 10 via passages 142, 144 (not depicted in detail). As previously stated, the TCM 17 activates the various clutches to achieve one of the transmission operating range states through selective actuation of hydraulic circuit flow control devices including variable pressure control solenoids (PCS) PCS1 108, PCS 2 112, PCS3 114, PCS4 116 and solenoid-controlled flow management valves, X-valve 119 and Y-valve 121. The hydraulic control circuit 42 is fluidly connected to pressure switches PS1, PS2, PS3, and PS4 via passages 124, 122, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS2 112 has a control position of normally high, and is fluidly connected to spool valve 113 and operative to effect flow therethrough when actuated. Spool valve 113 is fluidly connected to pressure switch PS3 via passage 126. Pressure control solenoid PCS3 114 has a control position of normally high, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High (1) and Low (0). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS2 via passage 122.

The hydraulic control circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 112, PCS3 114 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| | X-Valve Logic | Y-Valve Logic | PCS1 | PCS2 | PCS3 | PCS4 |
|---|---|---|---|---|---|---|
| | | | Transmission Operating Range State | | | |
| | No Latch | C2 Latch | Normal High | Normal High | Normal High | Normal Low |
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state including one of the first continuously variable mode and the first and second fixed gear operations. A High Range is defined as a transmission operating range state including one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to activate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. The operating range state can be determined by an optimization routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging.

Figure 4:
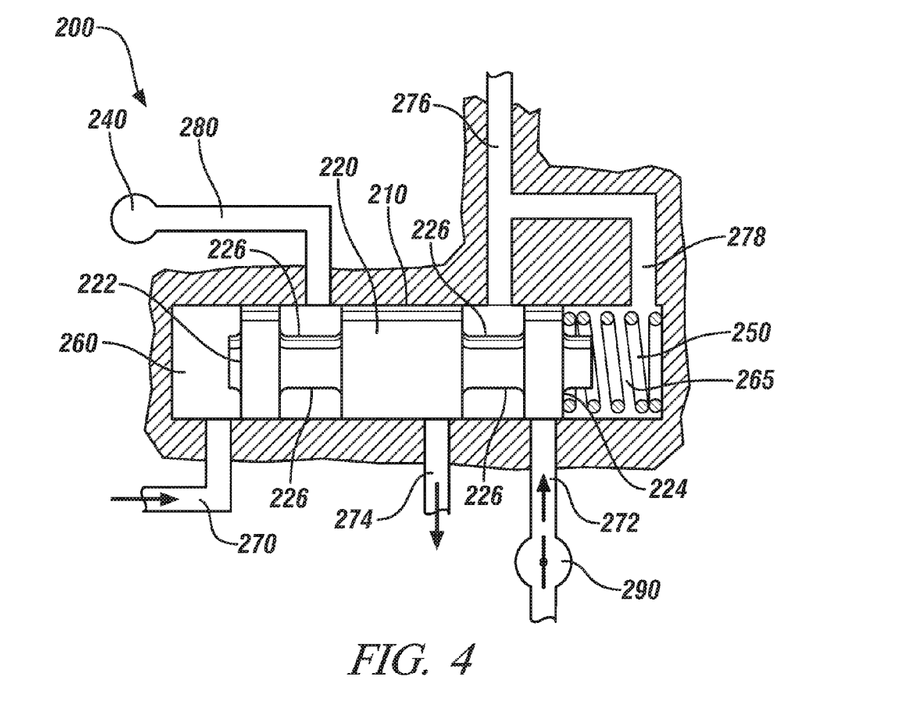
FIG. 4 illustrates an exemplary clutch control circuit utilizing a flow control device, in accordance with the present disclosure.

FIG. 4 schematically illustrates an exemplary clutch control circuit utilizing a flow control valve, in accordance with the present disclosure. Clutch control circuit includes flow control device 210, a pressure switch 240, and hydraulic lines 270, 272, 274, 276, 278 and 280. The flow control device 210 is a pressure control solenoid (PCS) in the exemplary embodiment. The flow control device 210 will interchangeably be referred to as PCS 210. In an exemplary embodiment, PCS 210 corresponds to one of PCS2 112, PCS3, 114 and PCS 4 116. Plunger 220 is selectively acted upon from a first end 222 of the plunger and a second end 224 of the plunger, the balance of forces determining the translative position of the plunger within the PCS. Plunger 220 includes plunger details 226 including holes, grooves, channels, or other features formed on the plunger in order to selectively direct hydraulic oil between various ports connecting hydraulic lines to PCS 210. The position of plunger 220 within PCS 210, corresponding to clutch states described above, selectively align plunger details 226 with hydraulic lines accomplishing the intended clutch function. In the exemplary clutch of FIG. 4, a plunger position to the right corresponds to a full feed state, wherein hydraulic pressure from a main pressure line 272 is channeled through plunger details 226 to clutch feed line 276. In an exemplary embodiment, the clutch feed line 276 provides a pressurized flow of hydraulic fluid to activate and lock a clutch corresponding to one of clutches C1 70, C2 63, C3 73, and C4 75. The flow from the main pressure line 272 can be blocked or prevented from entering the PCS 272 by closing a flow management valve 290. In an exemplary embodiment, the flow management valve 290 is a solenoid-controlled flow management valve corresponding to one of the X-valve 119 and the Y-valve 121 illustrated in FIG. 3. Similarly, a plunger position to the left corresponds to an exhaust state, wherein hydraulic oil within the clutch is allowed to escape the clutch and flow through exhaust line 274, entering a hydraulic control system return line. An increase in pressure within command pressure volume 260 increases the force acting upon plunger 220 from the side of first end 222. A valve return spring 250 applies a force to the second end 224, acting as a restorative force in the opposite direction of the pressure within command pressure volume 260. Hydraulic fluid from feedback line 278 re-enters PCS 210 within a feedback pressure volume 265 located on the same side of plunger 220 as spring 250. Force resulting upon plunger 220 from hydraulic pressure within feedback pressure volume 265 counteracts force resulting from hydraulic pressure within command pressure volume 260. As a result, wherein a balance of forces resulting from pressure within command pressure volume 260 and spring 250 would cause plunger 220 to be in a position correlating to a full feed state, elevated pressure achieved within clutch feed line 276 associated with a clutch fill event reaching a certain progression creates a force acting upon plunger 220 away from the full feed state position. PCS 210 is known to include pressure switch 240, fed by pressure switch line 280, utilized in known control methods to indicate pressure levels required for control of PCS 210. In this way, PCS 210 can selectively channel a pressurized flow of hydraulic fluid to accomplish multiple states within a hydraulically activated clutch.

A number of PCS physical configurations are known. One exemplary PCS configuration, as described above, utilizes a cylindrical plunger located in a cylindrical housing. However, a multitude of shapes, configurations, activations methods, and calibration strategies are known in the art, and this disclosure is not intended to be limited to the particular exemplary embodiments described herein.

Figure 5:
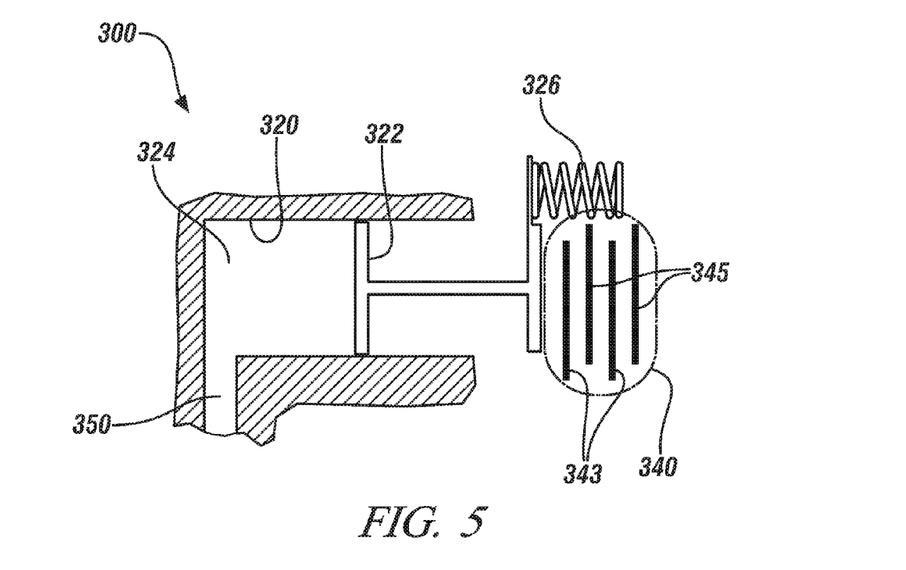
FIG. 5 illustrates an exemplary hydraulically activated clutch device operated to provide clamping force upon a mechanical clutch, in accordance with the present disclosure.

A hydraulically activated clutch device utilizes selectively activated pressurized flow of hydraulic fluid to create a desired motion or compression. An exemplary clutch device operates by receiving pressurized hydraulic fluid into a clutch volume chamber. FIG. 5 schematically illustrates an exemplary hydraulically activated clutch device operated to provide clamping force upon a mechanical clutch, in accordance with the present disclosure. Clutch device 300 includes a clutch cylinder 320 and a mechanical clutch 340. Clutch cylinder 320 includes a piston 322 and a clutch volume chamber 324. Pressurized hydraulic fluid at some fill pressure enters clutch volume chamber 324 through hydraulic line 350. Hydraulic line 350 is fluidly connected with a mechanism for selectively applying hydraulic flow, such as an exemplary PCS device. Hydraulic oil in clutch volume chamber 324 exerts pressure upon features within the volume chamber. Piston 322 transforms the fill pressure exerted by the hydraulic fluid into a force. Positive hydraulic pressure is used to fill the clutch volume chamber 324 and move piston 322 in one direction. Return spring 326 is utilized to provide force to move piston 322 in the direction opposite to the direction achieved through the application of pressurized hydraulic fluid.

Mechanical clutch 340 is selectively actuated by the transmission of force through piston 322. The mechanical clutch 340 includes input components 343 and output components 345. When the mechanical clutch 340 is deactivated, unlocked and not applied, the input and output components 343, 345, respectively, are kept separate and are free to rotate independent of one another. When the mechanical clutch 340 is activated, locked and applied, the input and output components 343, 345, respectively, are in frictional contact with one another and rotate in unison.

The input components 343 include connective surfaces in the form of input clutch plates that are mechanically coupled to an oncoming torque providing member. For instance, the oncoming torque providing member can include a member of one of the three planetary gear sets 24, 26 and 28 of FIG. 1. Accordingly, the speed of the input components can be controlled by oncoming torque provided by at least one of first electric machine 56, the second electric machine 72 and the engine 12. The output components 345 include connective surfaces in the form of output clutch plates that are mechanically coupled to a torque receiving output member and can include a member of one of the three planetary gear sets 24, 26 and 28 of FIG. 1. It will be understood that the torque receiving output member is mechanically coupled to the output member 64 of the transmission 10.

In the exemplary embodiment, sensors are located on the crankshaft connected to the engine, providing $N_I$, both electric machines, providing $N_A$ and $N_B$, and the output shaft connected to the driveline, providing $N_O$. Accordingly, rotational speeds of the various members within the transmission are commonly monitored. It will be appreciated that known rotational speeds of known members within the transmission 10 can be utilized to determine the rotational speeds of unknown members within the transmission based on how many degrees of freedom exist within the transmission. Accordingly, rotational speeds of the input and output components 343, 345, respectively, can be monitored.

Between rotating objects applying a torque, the torque capacity ($T_C$) generated between the input and output components 343, 345, respectively, can be determined by the following relationship:

$$T_C = \frac{2}{3} * f * F_A \quad [1]$$

wherein
f is the coefficient of friction between the rotating objects, and
$F_A$ is the axial force applied normally to direction of rotation of the objects.

As will be appreciated by one having ordinary skill in the art, f changes depending upon whether there is relative movement between the two objects. $F_A$ in mechanical clutch 340 is generated by compressive force transmitted through piston 322.

As described above, clutches transition between locked and unlocked states, and clutches designed to operate synchronously or without slip require substantially zero relative velocity between input and output components when reactive torque is transmitted through the clutch. Strategies for synchronous operation of clutches include synchronizing the clutch connective surfaces of the input and output components, then applying a clamping force to lock the clutch, thereby creating a clutch torque capacity in the clutch, and then transmitting reactive torque through the clutch. The order in which these operations are performed are important to synchronous operation, but also, the entire clutch transition must occur in as short a time span as possible to preserve drivability. Commands must be given to various powertrain components, accounting for reaction times, in order to generate the various operations involved in a shift occur in order with as little delay as possible.

In an exemplary embodiment of the present disclosure, failure conditions can be detected within a flow control device, such as the PCS 210, wherein the flow control device is stuck in an open state (e.g., full feed state) preventing the flow control device from controllably restricting any portion of the flow of hydraulic fluid from feeding the clutch device 300. When the flow control device is stuck in the open state, unintended activation of an associated hydraulic clutch (e.g., clutch device 300) can occur. Accordingly, a flow management valve (e.g., X-Valve 119 or Y-Valve 121) can be selectively switched to a closed state to prevent the flow of hydraulic fluid from enter the flow control device and feeding the clutch device. However, when the flow of hydraulic fluid is prevented from entering the associated flow control device and feeding the clutch device, the clutch device is inhibited from operating, thereby resulting in limited powertrain operation of the vehicle. Exemplary embodiments, discussed in greater detail below with reference to FIG. 6, include selectively switching the flow management valve to an open position to permit the flow of hydraulic fluid to enter the flow control device for activating the clutch device only if the clutch device has been synchronized. In other words, the flow management valve can operate to selectively activate the clutch device during a failure condition within the flow control device when the clutch device is intended for activation based on a desired operating range state of the transmission requiring application of the clutch. Likewise, when the clutch device 300 is no longer intended for activation, the flow management valve can operate to selectively deactivate the clutch device 300 during the failure condition within the flow control device when the clutch device is no longer intended for activation.

Figure 6:
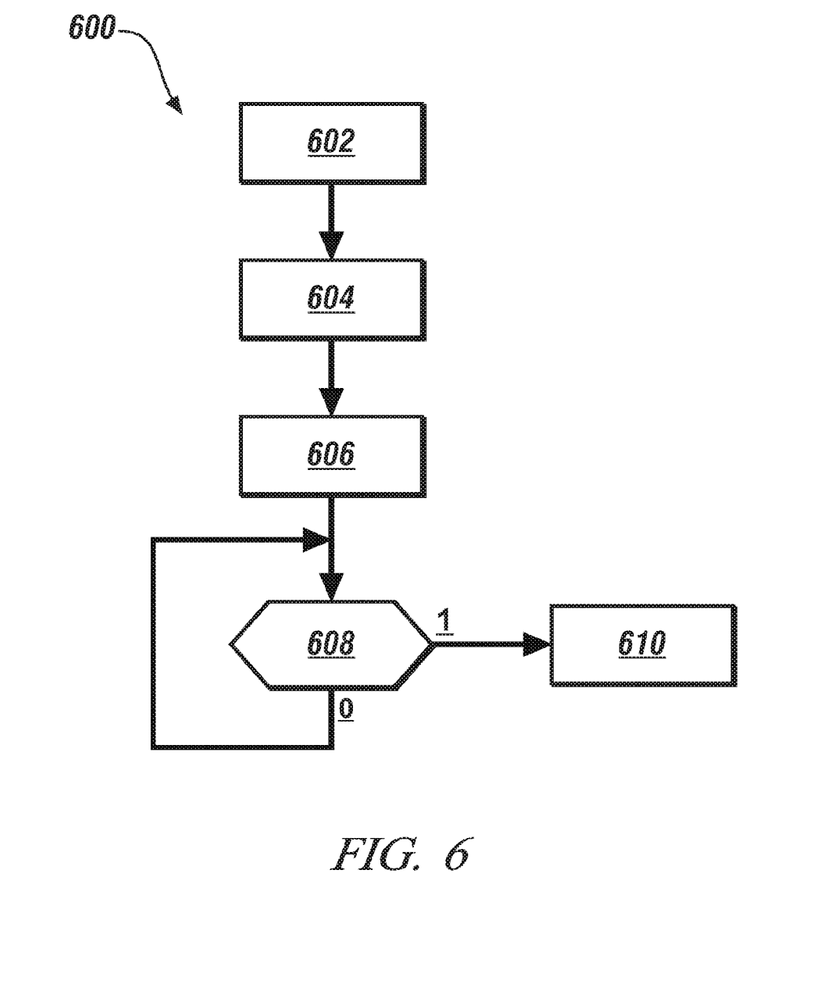
FIG. 6 illustrates a flow chart for utilizing a solenoid-controlled flow management valve for activating a mechanical clutch device when a failure condition has been detected in a pressure control solenoid associated with the clutch device, in accordance with the present disclosure.

In an exemplary embodiment, FIG. 6 illustrates an exemplary flow chart 600 for controlling an exemplary clutch device when a failure condition is detected in an associated flow control device configured to facilitate flow of hydraulic fluid for operating the clutch device. It will be appreciated that the exemplary flow chart 600 can be implemented within either of the TCM 17 or the HCP 5 illustrated in FIGS. 1 and 2. Table 3 is provided as a key to FIG. 6 wherein the numerically labeled blocks and the corresponding functions are set forth as follows.

TABLE 1

| BLOCK | BLOCK CONTENTS |
|---|---|
| 602 | A failure condition is detected within a flow control device. |
| 604 | Flow of hydraulic fluid is selectively prevented from entering the flow control device and feeding a clutch device. |
| 606 | Initiating synchronization of the clutch device when the clutch device is intended for activation. |
| 608 | Is the clutch device synchronized? |
| 610 | Flow of hydraulic fluid is selectively permitted to enter the flow control device for activating the clutch device only if the clutch device is synchronized. |

Referring to block 602, a failure condition is detected within a flow control device. In an exemplary embodiment, the flow control device can correspond to one of the pressure control solenoids PCS2 112, PCS3 114 and PCS4 116. As discussed above, the failure condition within the flow control device terminates the ability of the flow control device to controllably prevent the flow of hydraulic fluid from being fed to an associated clutch device. The detected failure condition indicates a pressure control solenoid is stuck in an open state preventing the pressure control solenoid from controllably restricting any portion of the flow of hydraulic fluid from feeding the clutch device.

With reference to the exemplary PCS 210 illustrated in FIG. 4, the failure condition within the flow control device (i.e., PCS 210) can be mechanical or electrical. As aforementioned, the failure condition resulting in the flow control device (i.e., PCS 210) being stuck open in the full feed state can be determined in response to the pressure switch 240 indicating a pressure level within the PCS 210 reaching a predetermined threshold. The failure condition within the PCS 210 can occur as a result of a damaged or inoperative return spring 250 incapable of providing a restorative force in the opposite direction of the pressure within command pressure volume 260. The failure condition within the PCS 210 can occur when the plunger 220 is stuck in the right position due to debris interfering with the movement of the plunger 220. The failure condition within the PCS 210 can occur due to an electrical failure resulting in the command pressure providing an excessive pressure within the command pressure volume 260. It will be understood, that this disclosure is not limited to the source of the failure condition resulting in the flow control device (i.e., PCS 210) being stuck open in the full feed state. The flowchart proceeds to block 604 when the failure condition is detected within the flow control device.

Referring to block 604, the flow of hydraulic fluid from entering the flow control device and feeding the clutch device is selectively prevented in response to the detected failure condition within the flow control device. The flow of hydraulic fluid is selectively prevented from entering the flow control device by selectively closing a flow management valve in response to the detected failure condition. The flow management valve can correspond to the flow management valve 290 illustrated in FIG. 4. The flow management valve 290 can correspond to one of the X-Valve 119 and the Y-Valve 121 that each include solenoids 118 and 120. It will be appreciated that the flow management valves have only two states: open and closed. Hence, the flow management valve either permits flow to enter the flow control device or prevents flow from entering the flow control device. The flow chart proceeds to block 606 after the flow management valve is selectively closed.

Referring to block 606, synchronization of the clutch device is initiated when the clutch device is intended for activation. For instance, a desired operating state of the transmission 10 of FIG. 1 can require application of the clutch device, and thus, the clutch device can be intended for activation. In other words, synchronization of the clutch device is initiated when the clutch device is intended to be locked based on the desired operating state of the transmission. Each of the transmission operating range states for the transmission 10 illustrated in FIG. 1 is described in the Table 1 and indicates which of the specific clutches C1 70, C2 62, C3 73, and C4 75 are activated, locked and applied for each of the operating range states.

Synchronization of the clutch device includes monitoring rotational speed of input components of the clutch device and rotational speed of output components of the clutch device. The rotational speed of the input components is controlled to achieve the monitored rotational speed of the output components. In one embodiment, input components of one of the clutches C1 70, C2 62, C3 73 and C4 75 can be controlled utilizing at least one of the electric machines 56 and 72. In another embodiment, input components of one of the clutches C1 70, C2 62, C3 73 and C4 75 can be controlled utilizing the engine 10 and/or at least one of the electric machines 56 and 72. As aforementioned, substantially zero relative velocity (i.e., a zero slip condition) between the input and output components is desired when reactive torque is transmitted through the clutch device. In an exemplary embodiment, the input and output components correspond to the input and output components 343, 345, respectively, of the clutch device 300 of FIG. 5. Once synchronization of the clutch device is initiated, the flowchart 600 proceeds to decision block 608.

Decision block 608 determines whether or not the clutch device is synchronized. A "1" indicates that the clutch device is synchronized. In other words, the relative rotational speed between the input and output components of the clutch device has a substantially zero relative velocity so that reactive torque can be transmitted through the clutch device to lock the clutch device. In an exemplary embodiment, the relative rotational speed between the input and output components is compared to a rotational speed threshold. If the rotational speed between the input and output components is less than the rotational speed threshold, decision block 608 determines that the clutch device is synchronized and proceeds to block 610. In a non-limiting example, the relative rotational speed threshold is 75 RPM. A "0" indicates that the clutch device is not synchronized. Accordingly, decision block 608 continues to monitor the relative rotational speed between the input and output components until the relative rotational speed between the input and output components is less than the rotational speed threshold.

Referring to block 610, flow of hydraulic fluid is selectively permitted to enter the flow control device for activating the clutch device only if the clutch device is synchronized. In an exemplary embodiment, this is accomplished by selectively opening the solenoid-controlled flow management valve (e.g., X-Valve 119 or Y-valve 121 shown in FIG. 3)

Selectively permitting the flow of hydraulic fluid to enter the flow control device for activating the clutch device includes feeding the clutch device with the flow of hydraulic fluid through the flow control device. The flow of hydraulic fluid fed to the clutch device provides a clamping force sufficient for locking the clutch device. In an exemplary embodiment with reference to FIGS. 4 and 5, selectively opening the solenoid-controlled flow management valve 290 permits the flow of hydraulic fluid to enter the PCS 210 for activating and locking the clutch device 300. It will be appreciated that the flow management valve 290 is fluidly coupled to a hydraulic fluid inlet 270 of the PCS 210 and the clutch device is fluidly coupled to a hydraulic feed line 276 of the PCS 210. Hence, the PCS 210 receives the flow of hydraulic fluid from the flow management valve 290 and feeds the flow of hydraulic fluid to the clutch device 300 when the failure condition is present in the PCS 210. In other words, the flow of hydraulic fluid feeds directly to the clutch device 300 when the flow management valve is selectively opened.

The clutch device remains locked subsequent to the provided clamping force for as long as the flow of hydraulic fluid is permitted to enter the flow control device. In an exemplary embodiment with reference to FIGS. 4 and 5, locking of the clutch device 300 (e.g., mechanical clutch 340) is maintained for as long as the solenoid-controlled flow management valve 290 remains opened. In other words, a torque capacity is maintained sufficient for locking the clutch device 300 that is provided by the flow of hydraulic fluid.

It will be appreciated that when the clutch device is no longer intended for activation, the flow of hydraulic fluid can be selectively prevented from entering the flow control device to deactivate the clutch device. In an exemplary embodiment with reference to FIGS. 4 and 5, when the flow of hydraulic fluid is selectively prevented from entering the PCS 210 to deactivate the clutch device 300 the flow of hydraulic fluid no longer fills the clutch volume chamber and the piston is retuned utilizing the return spring 326 to the direction opposite to the direction achieved through the feeding of the flow of hydraulic fluid.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to operate a clutch device in an electro-mechanical transmission mechanically-operatively coupled to an internal combustion engine and at least one electric machine, comprising:

in response to a failure condition detected within a flow control device configured to facilitate flow of hydraulic fluid for operating the clutch device, selectively preventing the flow of hydraulic fluid from entering the flow control device and feeding the clutch device;

initiating synchronization of the clutch device when the clutch device is intended for activation; and only if the clutch device is synchronized, selectively permitting the flow of hydraulic fluid to enter the flow control device to activate the clutch device.

2. The method of claim 1 wherein the failure condition within the flow control device terminates the ability of the flow control device to controllably prevent the flow of hydraulic fluid from being fed to the clutch device.

3. The method of claim 1 wherein the flow of hydraulic fluid is selectively prevented from entering the flow control device by selectively closing a flow management valve in response to the detected failure condition; and wherein the flow of hydraulic fluid is selectively permitted to enter the flow control device by selectively opening the flow management valve only after the clutch device is synchronized.

4. The method of claim 3 wherein the flow management valve is fluidly coupled to a hydraulic fluid inlet of the flow control device and the clutch device is fluidly coupled to a hydraulic feed line of the flow control device.

5. The method of claim 1 wherein the flow control device is a variable pressure control solenoid.

6. The method of claim 1 wherein initiating synchronization of the clutch device comprises:

monitoring rotational speed of input components of the clutch device and rotational speed of output components of the clutch device; and controlling the rotational speed of the input components toward the monitored rotational speed of the output components.

7. The method of claim 6 wherein the rotational speed of the input components is controlled utilizing the at least one electric machine.

8. The method of claim 1 wherein the clutch device is synchronized when a relative rotational speed between input components and output components of the clutch device is less than a predetermined rotational speed.

9. The method of claim 1 wherein the clutch device is intended for activation based on a desired operating range state of the transmission requiring application of the clutch device.

10. The method of claim 1 wherein selectively permitting the pressurized flow of hydraulic fluid to enter the flow control device to activate of the clutch device comprises:

feeding the clutch device with the flow of hydraulic fluid through the flow control device, the flow of hydraulic fluid fed to the clutch device providing a clamping force sufficient for locking the clutch device.

11. The method of claim 10 wherein the clutch device remains locked subsequent to the provided clamping force for as long as the flow of hydraulic fluid is permitted to enter the flow control device.

12. The method of claim 10 further comprising:

when the clutch device is no longer intended for activation, selectively preventing the flow of hydraulic fluid from entering the flow control device to deactivate the clutch device.

13. Method to operate a clutch device in an electro-mechanical transmission mechanically-operatively coupled to an internal combustion engine and at least one electric machine, comprising:

detecting a failure condition in a pressure control solenoid configured to facilitate flow of hydraulic fluid for operating the clutch device;

selectively closing a solenoid-controlled flow management valve to prevent the flow of hydraulic fluid from entering the pressure control solenoid and feeding the clutch device;

monitoring a desired operating state of the transmission;

initiating synchronization of the clutch device when the clutch device is intended to be locked based on the desired operating state of the transmission; and selectively opening the solenoid-controlled flow management valve to permit the flow of hydraulic fluid to enter the pressure control solenoid to lock the clutch device only if the clutch device is synchronized.

14. The method of claim 13 wherein the detected failure condition indicates the pressure control solenoid is stuck in an open state preventing the pressure control solenoid from controllably restricting the flow of hydraulic fluid feeding the clutch device.

15. The method of claim 13 wherein the pressure control solenoid receives the flow of hydraulic fluid from the flow management valve and feeds the flow of hydraulic fluid to the clutch device.

16. The method of claim 13 wherein initiating synchronization of the clutch device when the clutch device is intended to be locked comprises:

monitoring rotational speed of input components of the clutch device and rotational speed of output components of the clutch device; and controlling the rotational speed of the input components toward the monitored rotational speed of the output components.

17. The method of claim 16 wherein the rotational speed of the input components is controlled utilizing the at least one electric machine.

18. The method of claim 16 wherein the rotational speed of the input components is controlled utilizing the engine.

19. The method of claim 13 wherein selectively opening the solenoid-controlled flow management valve to permit the flow of hydraulic fluid further comprises:

maintaining the clutch device locked for as long as the solenoid-controlled flow management valve remains opened.

* * * * *